United States Patent [19]

Huang

[11] 4,216,857
[45] Aug. 12, 1980

[54] BOX FOR RESERVING CASSETTE OR CARTRIDGE

[76] Inventor: Lung-Fei Huang, No. 28-1, Alley 113, Lane 181, Ta Tung Rd., Tainan, Taiwan

[21] Appl. No.: 31,595

[22] Filed: Apr. 19, 1979

[51] Int. Cl.² .................. B65D 55/02; B65D 85/62
[52] U.S. Cl. ........................ 206/1.5; 206/387;
  206/504; 206/509; 220/23.4; 220/23.6; 70/63
[58] Field of Search ............ 206/387, 1.5, 504, 509;
  220/23.4, 23.6; 70/63

[56] References Cited

U.S. PATENT DOCUMENTS

| 1,733,772 | 10/1929 | Battershell | 206/1.5 |
| 2,499,765 | 3/1950 | MacLaren | 206/1.5 |
| 3,899,229 | 8/1975 | Ackeret | 206/387 |

Primary Examiner—William T. Dixson, Jr.
Attorney, Agent, or Firm—Armstrong, Nikaido, Marmelstein & Kubovcik

[57] ABSTRACT

A box for reserving cassette or cartridge comprises a shield having flanges and channels on its outer surface for engaging with other shields, and a drawer assembled in the said shield for accepting cassette or cartridge, which having accessories of a spring and a steel ball etc. and may be opened from said shield to present the reserved cassette or cartridge by slightly pressing the front wall of the drawer. Therefore, the present invention is convenient for taking out or putting in a cassette or cartridge. Due to the fact that a plurality of boxes can be engaged together, the boxes may be easily classified and managed according to the tapes contained therein. Furthermore, the boxes occupy a smaller space than conventional boxes.

3 Claims, 6 Drawing Figures

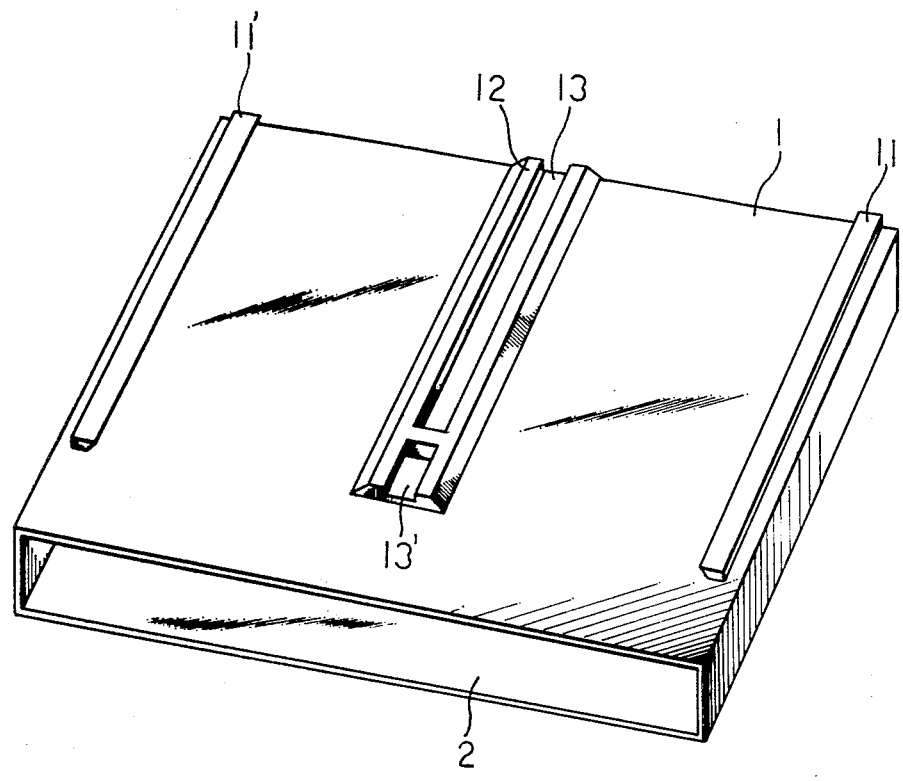
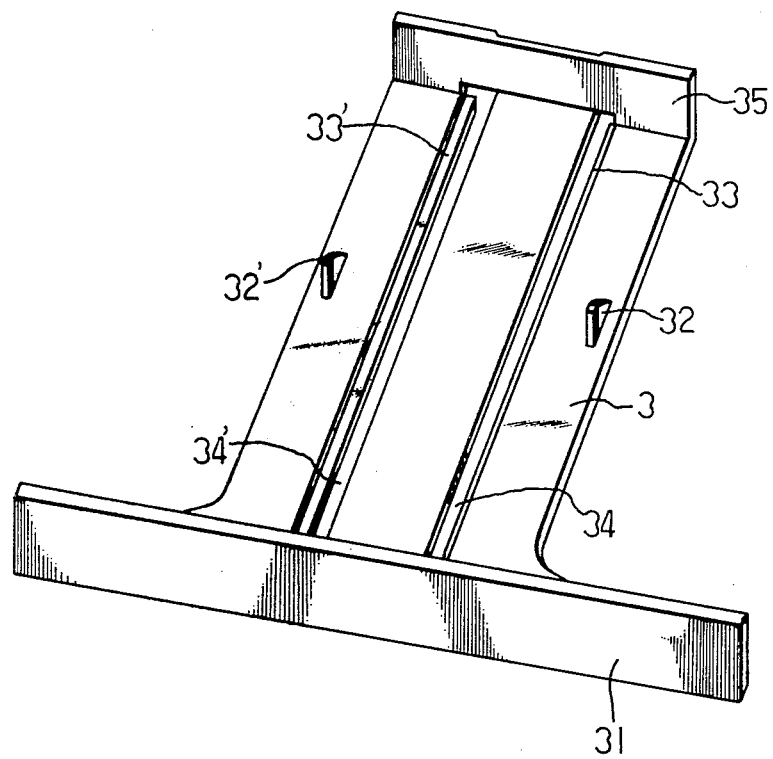
F I G. 1

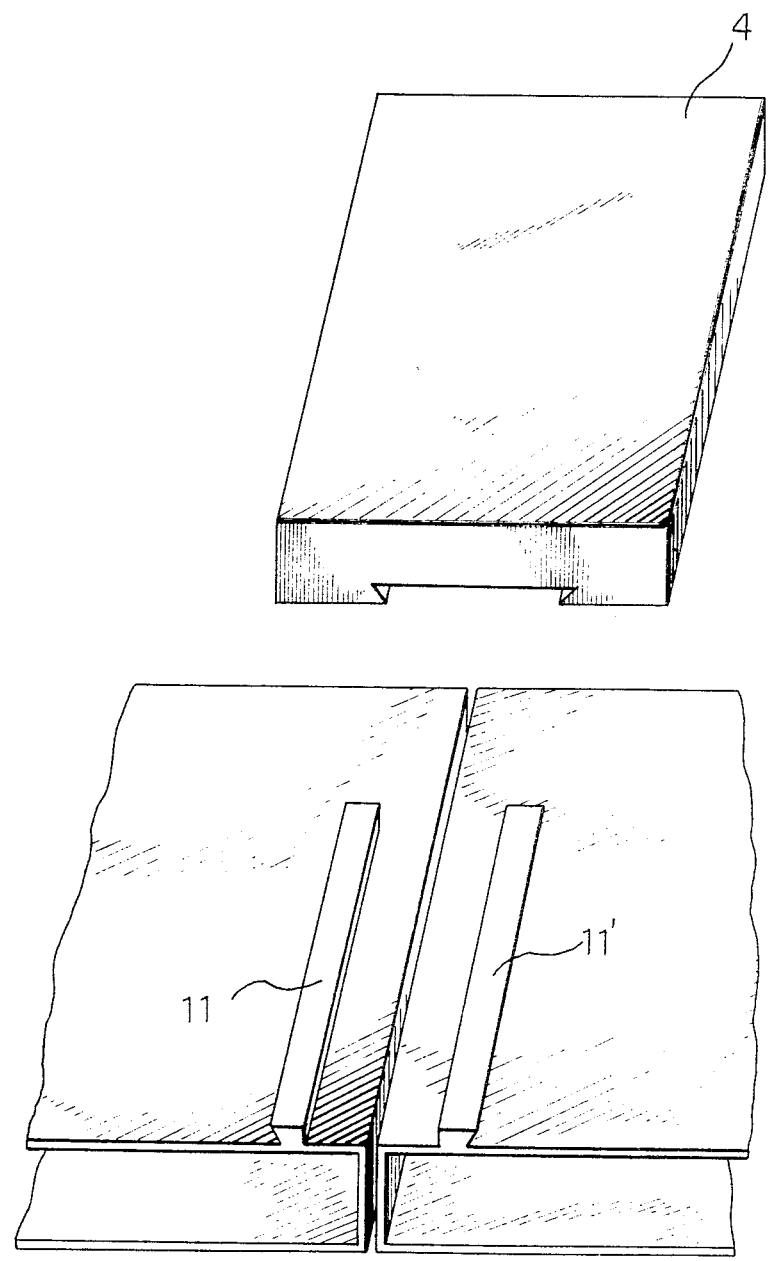
F I G. 6

BOX FOR RESERVING CASSETTE OR CARTRIDGE

BACKGROUND OF THE INVENTION

Some kinds of boxes are available for reserving a cassette or cartridge, but most of them cannot protect the tape reserved therein and cause the tapes to be damaged by humidity, dust and oxidation. Moreover, these boxes cannot be engaged together and are very difficult to classify. When a certain tape is needed, many boxes must be opened for searching the exact tape, which takes time and causes inconvenience. A rotational case for reserving and classifying cassettes and cartridges is available, however it occupies a large space and is not practical.

The present invention thus relates to a novel box for reserving a cassette or cartridge which overcomes the disadvantages of the conventional boxes.

An object of the present invention is to provide a box having a shield and a drawer therein for placing a cassette or cartridge. Each shield has corresponding flanges and channels for engaging with other shields to form an embodiment. The use of boxes disclosed herein results in convenient management and classification of tapes.

Another object of the invention is to provide a box having a drawer for containing a cassette or cartridge in a shield. The drawer can be opened from said shield in order to present the reserved cassette or cartridge by slightly pressing the front wall of the drawer.

An additional object of the invention is to provide a box which occupies a small space when a plurality of them are engaged together. They also provide good protection to the tapes reserved therein.

These and other objects and features of this invention will be better understood and appreciated from the following detailed description of a prefer embodiment thereof, by way of example only, in the accompanying drawings.

BRIEF DESCRIPTION OF THE DRAWINGS

FIG. 1 is a top perspective view of the box of the present invention;

FIG. 6 is another engagement way of the present boxes.

DETAILED DESCRIPTION OF THE INVENTION

Figure 2:
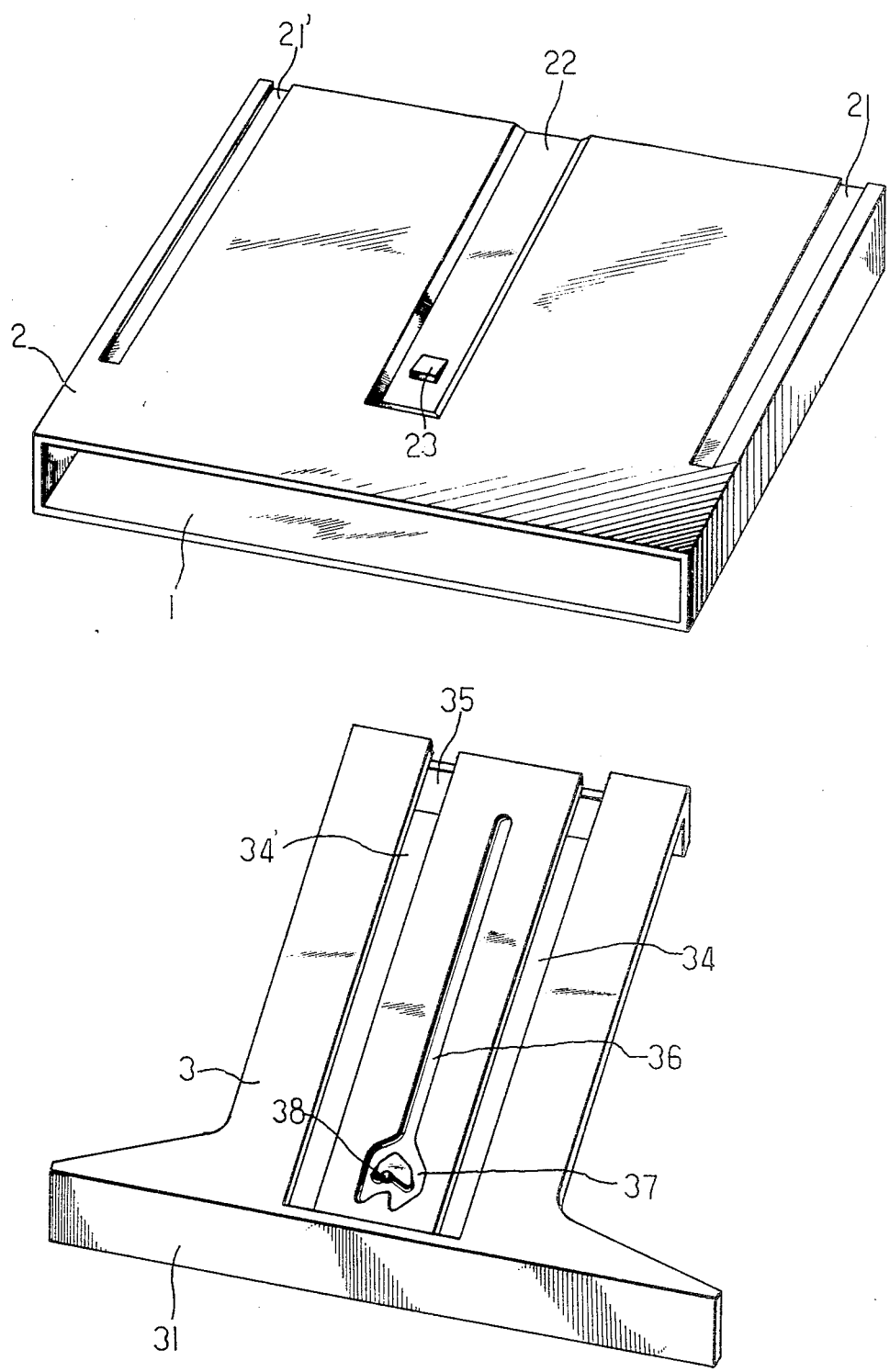
FIG. 2 is a bottom perspective view of the box of the present invention.

As shown in FIG. 1, the box of the present invention comprises a shield and a drawer. The top wall 1 of the shield has two parallel rails 11, 11', each having a vertical outer side and an inward sloping side. Between the two parallel rails, there is a flange 12 having two sections of grooves 13, 13'. The drawer may be inserted into the shield, which comprises a bed 3 for a cassette or cartridge, a front wall 31 and a rear wall 35. A label having description regarding the reserved tape may be adhesived on the front wall 31. The two lobes 32,32' insert into the holes of the two hubs of the cassette placed therein. 33, 33' represent two channels. 34, 34' represent two slots.

The bottom wall 2 as shown in FIG. 2 comprises two channels 21, 21' and a concavity 22 corresponding to the rails 11, 11' and the flange 13 on top wall 1 of the shield respectively. 23 represents a sloping block. The bottom side of the cassette bed 3 contains a groove 36 where a steel ball 28 may rotate freely therein. The front end 37 of the groove 36 is a loop having a shape shown in the figure. The area toward the rear end of the groove 36 has a gradually decreased depth.

Figure 3:
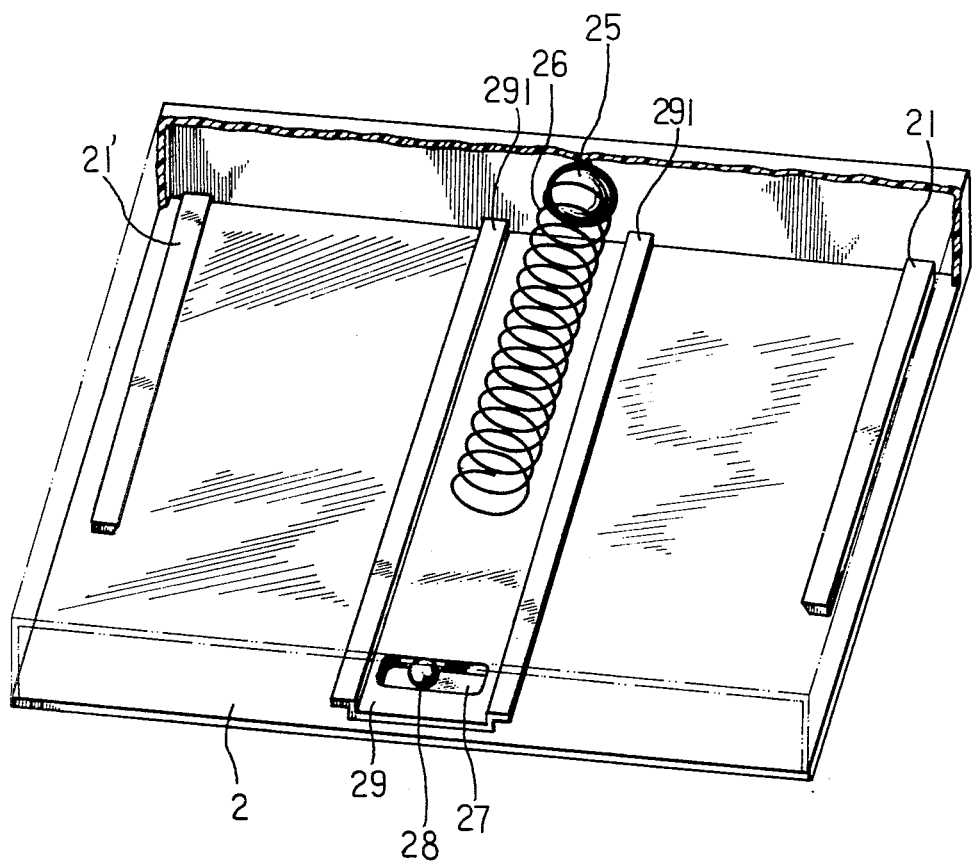
FIG. 3 is a view of the box showing the inner structure of its shield.

As shown in FIG. 3, the inner structure of the shield comprises two channel 21, 21', a rounded protuberance 25 is connected with a spring 26, a stripe 29 is connected to the bottom wall 2, which has two upwardly bent edges 291, 291' for engagement with the two corresponding channels 33, 33' on the cassette bed 3 of the drawer. Near the front end of the stripe 29 is a hole 27 having a steel ball 28 therein.

Figure 4:
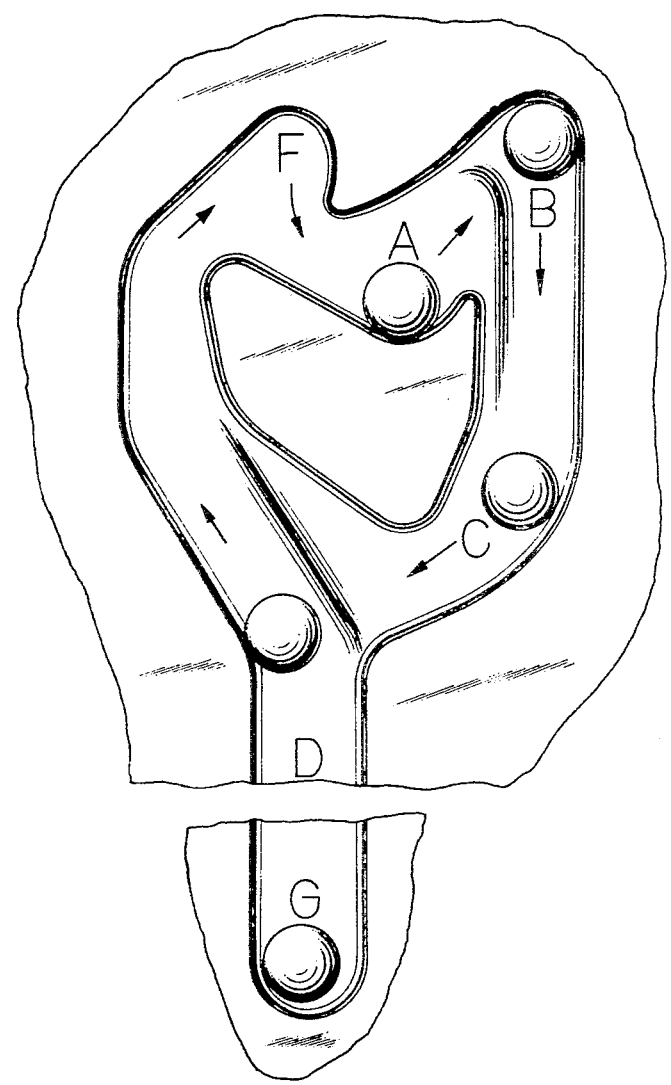
FIG. 4 is a view of steel ball groove on bottom side of the drawer of the box.

The relation of steel ball 28 and the groove 36, when open and close the drawer, is disclosed in FIG. 4. As the two edges 291, 291' of the stripe 29 on the bottom wall 2 of the shield are engaged with the two channels 33, 33' on cassette bed 3 of the drawer. The steel ball 28 is clamped between the hole 27 on the stripe 29 and the groove 36 on bottom side of the drawer. When the drawer is closed, the steel ball 28 is at the position A in the front end 27 of the groove 36 as shown in FIG. 4. When the front wall 31 of the drawer, is pressed slightly (due to the fact that position B is lower than the position A,) the ball rolls to the position B because of gravity. As soon as the pressure on the front wall 31 is eliminated, the spring 26 presses the drawer and the ball rolls to the position C, then to the position D, and finally to the position G. When the drawer is projected to the utmost extent the cassette or cartridge tape can easily be taken out. When pressing the front wall 31 forwardly to close the drawer, (due to the fact that the position E is lower than the position D,) the ball rolls to the position E by gravity, and then to the position F. However, the spring 26 is still pressing against the drawer, so the ball rolls to position A and then stops. When position A is reached, the front wall 31 just covers the shield and closes the box.

Figure 5:
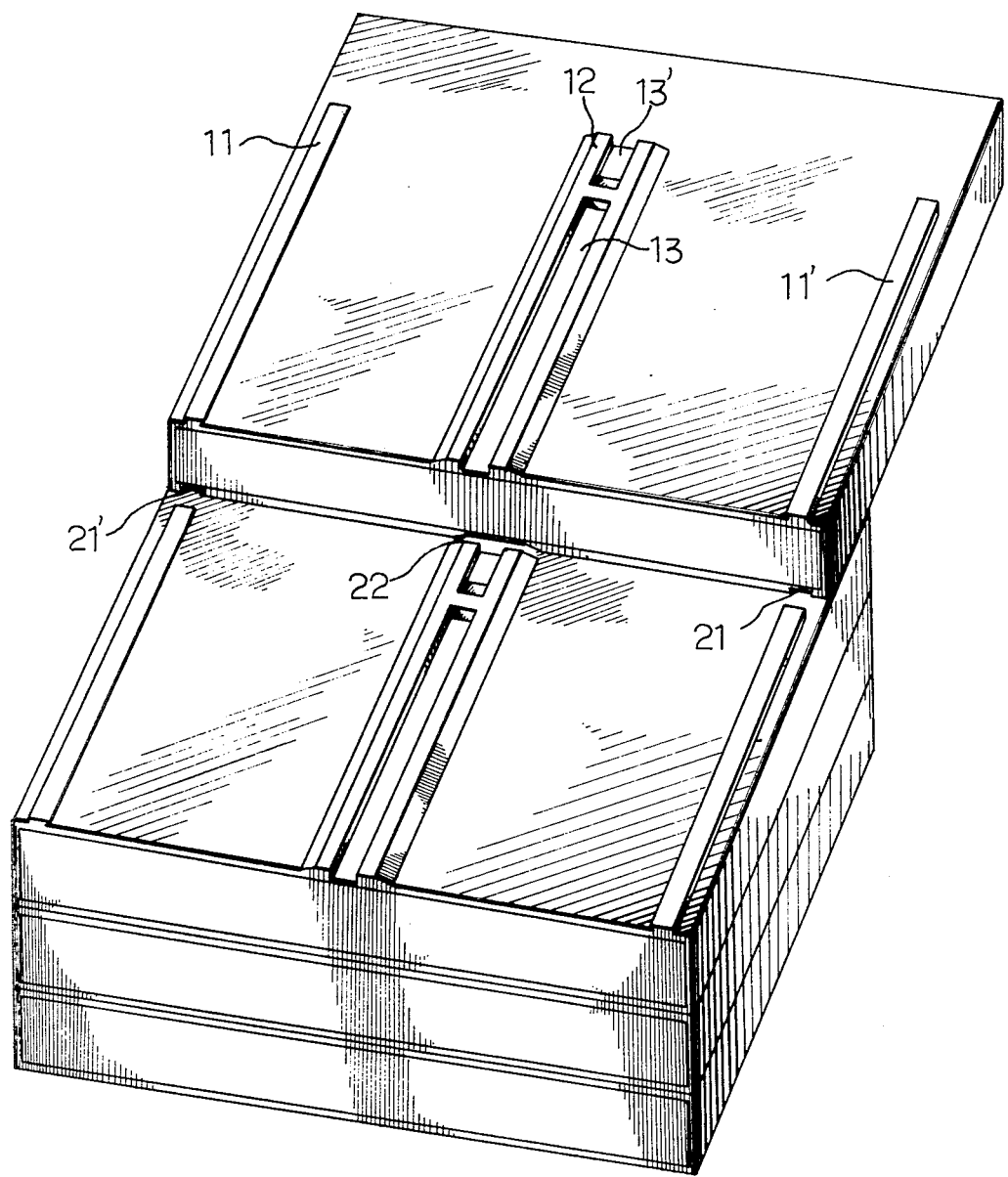
FIG. 5 is one of the engagement ways of the present boxes.

FIG. 5 showing the boxes are connected together vertically by engaging the channels 21, 21' and the concavity 22 on the bottom wall 2 of a box with the rails 11, 11' and the flange 13 on the top wall 1 of the neighboring box. Furthermore, the slopping block 23 on the bottom wall 2 hooks with the groove 13 and then with the groove 13' to make the boxes engaged tightly.

FIG. 6 showing the boxes connected together horizontally by using a connector 4 to connect the two rails 11, 11' of the neighboring boxes. The connector 4 has two inward sloping walls complying with the sloping sides of the rails 11, 11'. This example can also be used in the horizontal connection of several columns of vertically connected boxes.

I claim:

1. A box for reserving an encased magnetic recording tape, comprising:

a shield having rails and flanges positioned on its top wall, said rails and flanges corresponding to channels and concavities on its bottom wall, said bottom wall having a hole therein, said shield further comprising a back wall and side walls interconnecting said top and bottom walls, said side walls having flat outer surfaces;

a drawer insertable within said shield, said drawer providing a space for reserving said encased magnetic recording tape, said drawer having a front wall for covering an open end of said shield, a rear wall, and a bottom bed portion, said bed portion having a groove on its underside;

a spring positioned between said back wall of said shield and said rear wall of said drawer; and a steel ball being positioned partially within said hole and partially within said groove, wherein when said drawer is inserted within shield said steel ball is moved along a longitudinal portion of said groove while being held within said hole until said ball reaches a stopping point in said groove at the front end of said groove, whereby said drawer is held in a closed position with said spring forcing said drawer outward until an inward force is applied against said spring causing said ball to be moved from said stopping point and allowing said ball to move within said longitudinal portion of said groove so that said drawer is opened.

2. A box for reserving an encased magnetic recording tape as in claim 1, wherein a plurality of said boxes are connected horizontally by positioning said flat outer surfaces of said side walls of two of said boxes together and engaging one of said concavities in said bottom wall of a third box positioned above said two boxes with one of said rails on said top wall of each of said two boxes, thereby connecting said two boxes horizontally by means of said third box vertically positioned over said two boxes.

3. A box for reserving an encased magnetic recording tape as in claim 1, wherein a plurality of said boxes are connected vertically by positioning said boxes such that said rails and flanges on said top wall of a box are engaged within said channels and concavities on said bottom wall of a box.

* * * * *